J. A. SLATER.
Apparatus for Treating Offal.

No. 135,733. Patented Feb. 11, 1873.

Witnesses.
Alex Davidson
Harry Coleman

Inventor.
John A. Slater
Per H. S. Abbot
Attorney

UNITED STATES PATENT OFFICE.

JOHN A. SLATER, OF NEW HAVEN, CONNECTICUT.

IMPROVEMENT IN APPARATUS FOR TREATING OFFAL.

Specification forming part of Letters Patent No. 135,733, dated February 11, 1873.

*To all whom it may concern:*

Be it known that I, JOHN A. SLATER, of New Haven, in the county of New Haven and State of Connecticut, have invented certain new and useful Improvements in Machines for Treating Animal Matter for Fertilizers; and I do hereby declare that the following is a full, clear, and exact description thereof, that will enable others skilled in the art to which it appertains to make and use the same, reference being had to the accompanying drawing and to the letters of reference marked thereon, which form a part of this specification.

The nature of my invention relates to that class of machines for treating animal matter for fertilizers and all other analogous substances where an even heat and motion are required; and consists in a double or jacketed tank and two or more hollow revolving cylinders having stirrers attached to their surfaces, so that when steam is admitted to the cylinders and the jacket an even steady heat is applied to the substance to be treated, while the revolution of the cylinders causes an even continuous motion.

Figure 1:
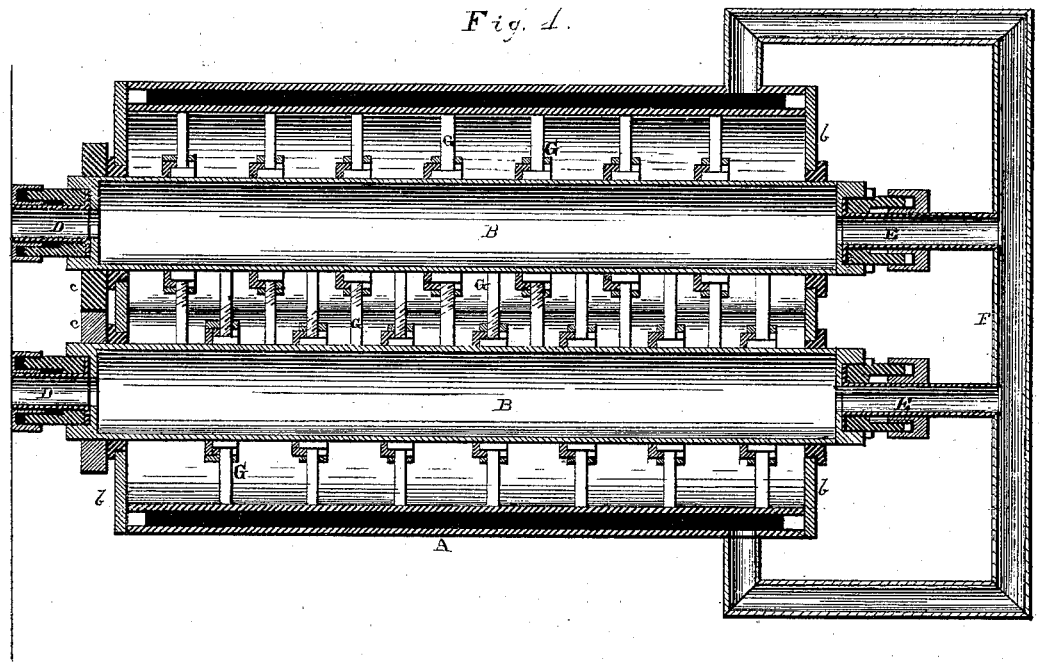
Figure 2:
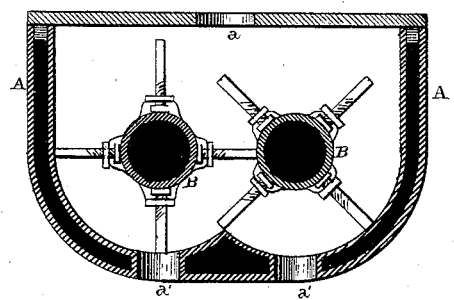

In the accompanying drawing, Figure 1 represents a horizontal longitudinal section, and Fig. 2 a transverse section, of my machine.

A represents a double or jacketed tank of any suitable dimension or shape, and which is provided with the openings $a$ $a'$ for the introduction and removal of the material to be treated. Extending lengthwise through the tank are two revolving cylinders, B, having their bearing in the heads $b$, which are provided with suitable stuffing boxes or journals, so as to be steam or water tight. These cylinders are geared together at one end by the wheels $c$, so as to revolve evenly together, and have a pipe, D E, connecting with each end by means of stuffing-boxes or other suitable devices, one for the admission of steam to the cylinders from the boiler or generator, and the other is attached to the pipe F, so as to communicate with the jacket of the tank. Secured to the peripheries of each cylinder along their entire length are teeth or stirrers G, which are secured in place by means of the slotted recesses and nuts or by any other suitable devices, provided they do not pass through the shell of cylinders. The tank A is also provided with suitable openings for the escape of steam or the admission of air, caused by evaporation or condensation, from the heating and cooling of the cylinders.

The operation is as follows: The scraps of animals or fish out of which the fertilizer is to be made are introduced into the tank A, and the openings $a'$ closed. Steam, which may be superheated or not, is admitted through the pipes D into the cylinders, from whence it passes through the pipes E F into the jacket, so that an even steady heat, which can be raised or lowered at will, is imparted both in the center and upon the sides of the mass to be treated. Power is at the same time applied to the cylinders so as to cause them to revolve and the stirrers to impart a slow or rapid movement to the mass. The motion reduces the matter to a pulverized state, and the heat evaporates all moisture contained therein, so that it can be transported in bags or barrels without heating.

I do not claim a jacketed tank and a revolving cylinder, heated by steam and provided with scrapers, which are not new.

Having thus described my invention, what I claim as new, and for which I desire to secure Letters Patent, is—

1. The combination of the cylinders B provided with removable teeth, the pipes E F, and jacketed tank, substantially as set forth.

2. In combination with the cylinders B, the detachable stirrers, as described.

3. The jacketed tank A, revolving cylinders B having detachable teeth, gears $c$, and pipes D, E, and F, when all are combined to operate in the manner and for the purpose set forth.

In testimony that I claim the foregoing I have hereunto set my hand this 26th day of October, 1872.

JOHN A. SLATER.

Witnesses:
CHAS. SANFORD,
WM. W. STONE.